United States Patent [19]

Wear et al.

[11] Patent Number: 4,746,968

[45] Date of Patent: May 24, 1988

[54] COMBINED MICROWAVE AND THERMAL DRYING APPARATUS

[75] Inventors: Frederick C. Wear; Garret G. Heil; Howard F. McKinney, all of St. Louis County, Mo.

[73] Assignee: McDonnell Douglas Corporation, St. Louis, Mo.

[21] Appl. No.: 31,354

[22] Filed: Mar. 30, 1987

[51] Int. Cl.[4] ............................................. H05B 6/72
[52] U.S. Cl. ..................... 219/10.55 F; 219/10.55 A; 219/10.55 B; 34/1
[58] Field of Search ................. 219/10.55 F, 10.55 A, 219/10.55 B, 10.55 E, 10.55 R; 34/1, 4; 343/770, 771, 767

[56] References Cited

U.S. PATENT DOCUMENTS

| | | | |
|---|---|---|---|
| 2,982,960 | 5/1961 | Shanks | 343/770 X |
| 3,230,483 | 1/1966 | Kinsey | 343/771 X |
| 3,320,396 | 5/1967 | Boehm | 219/10.55 B |
| 3,448,384 | 6/1969 | Scott | 219/10.55 R X |
| 3,562,471 | 2/1971 | White | 219/10.55 F |
| 3,845,266 | 10/1974 | Derby | 219/10.55 E |
| 4,015,341 | 4/1977 | McKinney et al. | 34/4 |
| 4,230,924 | 10/1980 | Brastad et al. | 219/10.55 F X |
| 4,301,347 | 11/1981 | Quine | 219/10.55 F |
| 4,347,670 | 9/1982 | Wear et al. | 34/1 |
| 4,435,629 | 3/1984 | Ishimaru et al. | 219/10.55 A |
| 4,640,020 | 2/1987 | Wear et al. | 34/1 |

Primary Examiner—Philip H. Leung
Attorney, Agent, or Firm—Gravely, Lieder & Woodruff

[57] ABSTRACT

In a microwave drying cavity, a thermal radiator provides infrared radiation that complements the microwave radiation in effecting a more uniform drying of a product within the cavity. The radiator includes a metal plate having apertures of a trifoliate configuration and electrical resistance-type heaters embedded in the plate. The trifoliate apertures permit microwave radiation of universal polarization to pass through the plate, so the radiator may be placed close to the product without shielding the product from the microwave radiation.

27 Claims, 3 Drawing Sheets

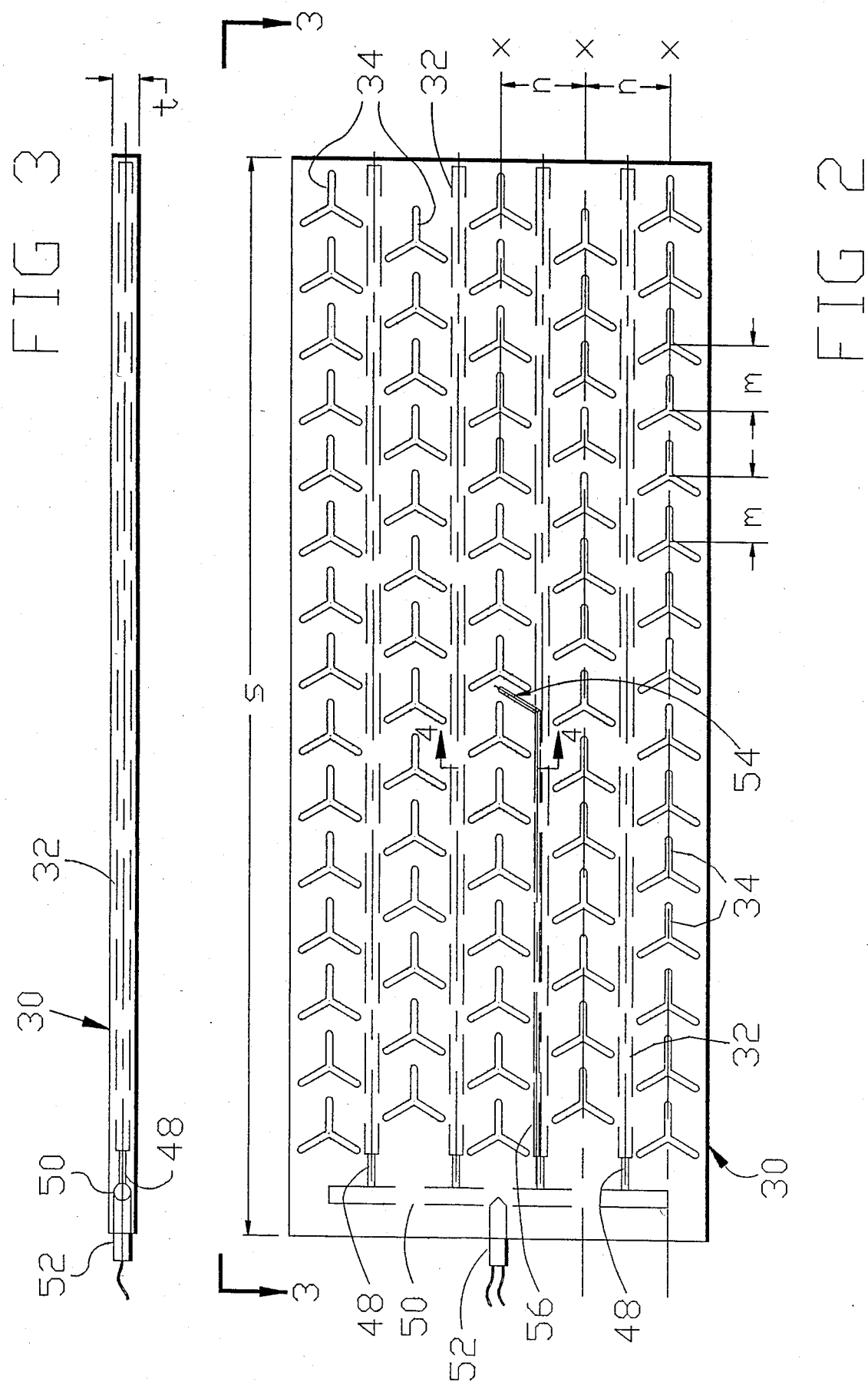

COMBINED MICROWAVE AND THERMAL DRYING APPARATUS

BACKGROUND OF THE INVENTION

This invention relates in general to apparatus for drying products and more particularly to a radiant heater for use in a microwave chamber and a microwave drying apparatus which utilizes such a heater.

Certain food products and seeds respond quite well to microwave radiation and are dried most effectively with such radiation. Generally speaking, any food product or seed which tends to form a hard shell when dried using more conventional heating procedures, such as hot air or infrared radiation, is a good candidate for microwave drying, for the microwave radiation heats the product generally from the inside out. Moisture evaporates more quickly from any product when the pressure of the environment in which that product is located is least, and accordingly some microwave dryers for food products subject the products to the microwave radiation in a vacuum chamber. U.S. Pat. Nos. 4,015,341 and 4,347,670 disclose vacuum-type microwave dryers.

Some products are very sensitive to temperature. If the temperature is too high in any part of the product, desirable characteristics of that product can deteriorate rapidly. To produce an optimal product at economic drying rates it is desirable to have the product temperature uniform and at the maximum value that the product will sustain without degradation. Microwave heating, by itself, tends to produce a rather uniform heating, at least when the product thicknesses is less than about a quarter wavelength of the microwave energy. However, if the product is in an environment where the surrounding atmosphere and walls are at significantly lower temperature than the product, the product tends to lose heat from its surface, resulting in a nonuniform temperature in the product. To make drying successful with microwaves alone it is necessary to dry it at a rate such that the interior never reaches the critical temperature at which the product deteriorates. This requirement may make the process time uneconomical.

On the other hand, infrared radiation, which may be derived from a simple heated panel, has just the opposite effect, that is to say, it heats from the outside in, so generally the exterior of any product heated with that type of radiation is hotter than the interior. Again, the product temperature is nonuniform and the drying rate is restricted such that the outer surface does not exceed the critical temperature while the inside dries. This requirement may extend the processing time so much that the process is uneconomical.

Attempts have been made to combine microwave and infrared heating devices so that the interior heating characteristics of the former offset the exterior heating characteristics of the latter and thus provide a more uniform temperature gradient in the product being dried, but these attempts have met with limited success. The primary problem resides in rendering the devices for delivering the two types of radiation to the product at the same location compatable so one does not adversely affect the other. In this regard, microwave energy is usually directed into a vacuum chamber and allowed to reflect about the chamber until it is absorbed by the product. Infrared energy, on the other hand, is normally emitted from a panel or some other surface which must be quite large and relatively close to the product to effect an adequate transmission of heat. Moreover, to effectively radiate, it should be formed from metal, but metal is opaque to microwave energy. Thus, when microwave and infrared heating devices are employed simultaneously at the same location, the metal microwave panel blocks much of the microwave energy.

In the case of a product which is transported on a belt through a vacuum chamber into which microwave radiation is introduced, the microwave energy will reach the product only a very limited distance inwardly from the sides of the belt. This restricts the width of the belt, requiring that it be considerably narrower than is desirable for efficient operation.

U.S. Pat. No. 4,640,020 discloses a microwave dryer in which the microwave drying is achieved in a vacuum chamber that also contains infrared panels, but the microwave and infrared drying do not occur simultaneously or at the same location, and thus the product being dried does not experience a uniform temperature gradient.

DESCRIPTION OF THE DRAWINGS

In the accompanying drawings which form part of the specification and wherein like numerals and letters refer to like parts wherever they occur

FIG. 2 is a plan view of a plate for a thermal radiator of the present invention;

FIG. 3 is a side elevational view of the plate taken along line 3—3 of FIG. 2;

DETAILED DESCRIPTION

Figure 1:
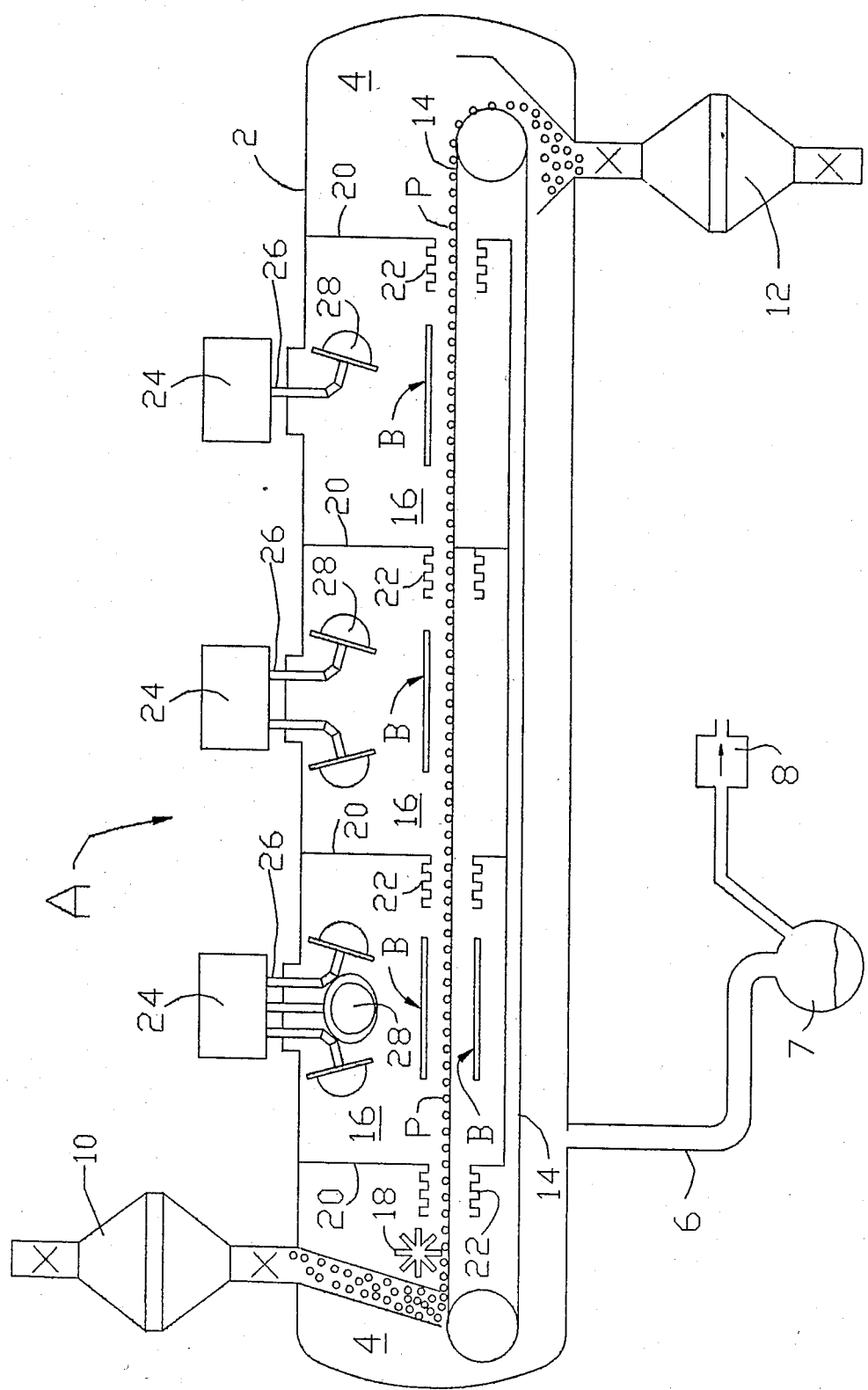
FIG. 1 is a sectional view of a vessel that encloses a vacuum chamber which contains thermal radiators constructed in accordance with and embodying the present invention.

Referring now to the drawings, a drying apparatus A (FIG. 1) which is suitable for drying a multitude of products p primarily of a granular or nodular constituency, such as food products and seeds, includes a sealed vessel 2 that encloses a vacuum chamber 4 which is evacuated through a vacuum line 6 that leads to a condensor 7 and vacuum pump 8. The product p is introduced into the chamber 4 through an airlock 10 and withdrawn through another airlock 12. Between the two airlocks 10 and 12 the product p is conveyed through a succession of zones 16 in the chamber 4 on an endless belt 14 that is formed from a material which is transparent to microwave radiation. Before the product p enters the first zone 16 a leveling wheel 18 distributes it to a generally uniform height and width on the upper pass of the belt 14 which then carries that product through the several zones 16 that are separated one from the other by septums 20 and microwave chokes 22. At each zone 16 a microwave generator 24 directs microwave radiation into the vacuum chamber 4 through a waveguide 26 having at its end a window 28 which is transparent to microwave radiation. The frequency of the radiation is of course such that it excites molecules of water, causing them to oscillate.

Since the product p will contain more moisture in the first zone 16 than the succeeding zones 16, the intensity of the microwave radiation is greatest in that zone, or in other words the power density is greatest in the first zone 16. Nevertheless, in any zone 16 the power density must be kept below the critical level at which the gas in the chamber 4 ionizes, and thus is dependent on the moisture content of the driest, that is the farthest downstream, product p in that zone 16. See U.S. Pat. No. 4,640,020 for a consideration of this problem.

The microwave radiation which is generated by the microwave generator 24 for any one of the zones 16 is directed into that zone through its waveguide 26, and within the zone the radiation reflects off of the cylindrical wall of the vessel 2 and the septums 20 to become generally omnidirectional. In other words, even though the radiation may be polarized as generated, it does not remain in its original condition of polarization after reflecting from the various surfaces which define the zone 16. Indeed, at any instant the microwave radiation within the chamber 4 exists in a multitude of polarizations. For the most part, the radiation is absorbed by the product p in the sense that it excites the molecules of water within the product p and causes them to oscillate at the frequency of the radiation. As a consequence, the temperature of the moisture rises, indeed above the boiling point, and escapes as steam into the rarified atmosphere of the vacuum chamber 4.

However, in some products the steam escapes rather slowly, and certainly much slower than the almost instantaneous heating produced by the microwave radiation. Were it not for a radiator B that is also located within each zone 16, the individual nodules or pieces of product on the belt 14 could experience a severe disparity in temperature between their centers and external surfaces—indeed a disparity perhaps great enough to cause internal burning. With microwave radiation alone the product p tends to be hotter on the interior than on the surface because of the heat losses from the surface. The drying rate is limited by the requirement that the interior not exceed a temperature that would cause degradation of the product p. The thermal radiator B provides the compensation necessary to cause the product p to dry at the maximum rate without exceeding the limiting temperature everywhere within the product p.

The thermal radiator B includes at least one relatively thin metal plate 30 (FIGS. 2 & 3) which is positioned along the endless belt 14 with one of its major surface areas facing the belt 14. Preferably the plate 30 is located directly over the upper or conveying pass of the belt 14 with its lower surface approximately 9 to 12 inches above the top surface of the product p (FIG. 1). Another radiator B may be located beneath the conveying pass of the belt 14 to heat the product p from beneath. In addition, to its plates 30, each radiator B includes at least one and preferably several resistance-type heaters 32 which are embedded in the plate 30. Notwithstanding that the plate 30 is formed of metal, the radiator B is still transparent to the microwave radiation within the zone 16 in which it is mounted.

Figure 5:
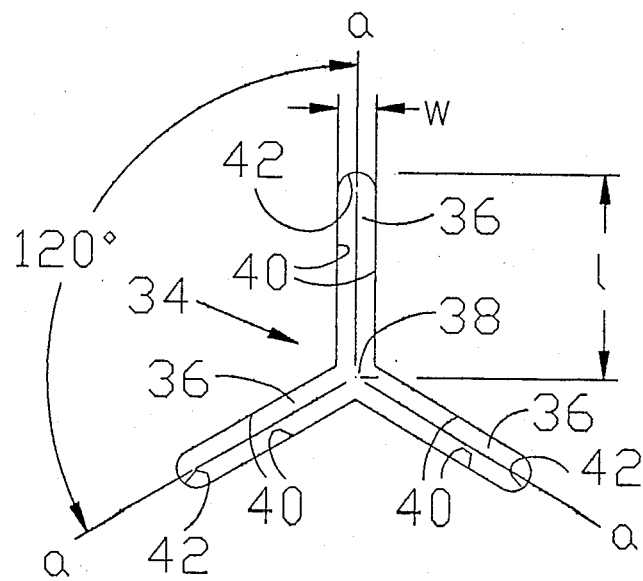
FIG. 5 is an enlarged view of a typical trifoliate aperture in the plate.

More specifically, the plate 30 of each radiator B is preferably cast from aluminum or some other metal that is a good conductor of heat. Its width s (FIG. 2) should be about the same as that of the endless belt 14 so that the plate 30 extends across the full width of the belt 14. On the other hand, its thickness t (FIG. 3) should be as small as possible, but from a practical standpoint it must accommodate the heaters 32. This prevents the thickness t from being much less than about one inch. The plate 30 contains a multitude of trifoliate apertures 34 (FIG. 2) that extend completely through the plate 30 so that each aperture 34 opens out of both major surface areas of the plate 30. Being trifoliate in configuration, each aperture has three segments or slots 36 (FIG. 5) which radiate from a common center 38. Each slot 36 is symetrical about an axis a for that slot and has side surfaces 40 which merge through an arcuate end surface 42, but are otherwise parallel to the axis a and to themselves as well. The spacing w between the side surfaces 42 of each slot 36 may range between 0.125 and 0.375 inches and is typically 0.25 inches. The axis a of the three slots 36 intersect at the center 38, forming three angles, each preferably 120°. In other words, the slots 36 of each trifoliate aperture 34 are arranged at 120° intervals. The length 1 of each segment 36, that is the distance from the intersection of the three axes a at the center 38 to the arcuate end surface 42 is dependent on the frequency of the microwave radiation within the zone 16 in which the radiator B is located and should preferably be about 0.25 times the wavelength for that radiation, but may range between 0.25 and 0.27 times the wavelength. For example, when the radiation has a frequency of 2540 megahertz, the length 1 of each slot 36 should preferably be 1.20 inches. On the other hand, when the frequency is reduced to 915 megahertz, the length 1 of each slot 36 should be about 3.22 inches. From a practical standpoint, those are the only lengths 1 of any significance, because the frequencies associated with those lengths are the only frequencies that the FCC has alotted for microwave heating devices.

The trifoliate apertures 34 are arranged in parallel rows that extend substantially the full length of the plate 30, each having a longitudinal axis x (FIG. 2). The rows are spaced equidistantly apart, and within each row as well as amongst all of the rows, the individual apertures 34 possess the same orientation. That orientation is such that one of the slots 36 is parallel to and indeed has its axis a common with the longitudinal axis x of the row, and as a consequence the other two slots 36 project away from the axis x, each at an angle of 60°. Thus, the slot 36 which is coincident with the axis x of the row projects directly toward the V-shaped intersection formed by the oblique slots 36 of the aperture 34 immediately preceding it in the row. The spacing m between adjacent apertures in the same row, that is the distance between the centers 38 of successive apertures 34, should be about 0.5 times the wavelength of the radiation, but may range between 0.5 and 0.55 times the wavelength.

While successive apertures 34 in the several rows are spaced equidistantly apart, they are staggered with respect to the apertures 34 of the adjacent rows, the offset being one-half the spacing in between the apertures 34 of any row. Thus, the centers 38 for the apertures 34 of any row are located midway between the centers for the apertures 34 in the adjacent rows, but are of course offset laterally by the spacing n between the rows. Ideally, the spacing n between the longitudinal axes x of adjacent rows should equal the spacing m between the apertures 34 of any row, but that leaves no room to accommodate the heaters 32 between the rows. Thus, the rows of apertures 34 are located as close to the ideal spacing as possible, that is the spacing n is reduced as much as possible without sacrificing the space required for the heaters 32.

Figure 4:
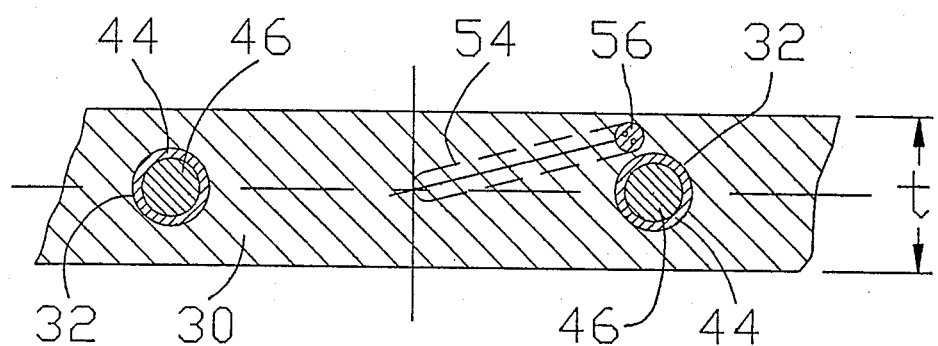
FIG. 4 is a sectional view of a plate taken along line 4—4 of FIG. 3.

While the heaters 32 should be as small as possible to avoid spreading adjacent rows of apertures 34 too far apart and to avoid making the plate 30 excessively thick, they should also be capable of elevating the temperature of the plate 30 to produce enough radiation to effectively heat the product p on the belt 14 from the outside in. Commercial rod-type heaters such as those manufactured and sold by Watlow Electric Company of St. Louis, Mo., under the trademark FIREROD have proven to be suitable for this purpose. These heaters 32 have a stainless steel tubular case 44 and resistance-type heating element 46 within the case 44 (FIG. 4). A typical heater 32 has an outside diameter of 0.5 inches, operates on single phase current at a potential of 240 V, and draws 2200 W. It is straight and almost as long as the plate 30. At its one end it is provided with a smaller diameter tube 48 (FIGS. 2 & 3) through which the wires that supply current to its heating element 46 pass.

The small tubes 48 of the individual heaters 32 are connected with a common cross duct 50 which is likewise embedded within the plate 30 (FIGS. 2 & 3). Midway between the ends of the cross duct 50, an entry duct 52 is connected to the cross duct 50, and the entry duct 52 projects out of and beyond the nearby end edge of the plate 30. The wires which supply electrical current to the heaters 32 pass into the entry duct 52 and thence through the cross duct 50 to the individual heaters 32. The heaters 32, the cross duct 50 and the entry duct 52 are preferably provided as a single assembly about which the plate 30 is cast. This brings the metal of the plate 30 into intimate contact with tubular cases 44 of the several heaters 32 so that the heat generated within each heater 32 is readily conducted into the metal of the plate 30. Any slight gap between the case 44 of a heater 32 and the plate 30 would serve as a very effective insulation because of the rarified atmosphere within the chamber 4.

Finally, the radiator B includes a temperature sensor 54 which is embedded in the metal plate 30 near the center of it (FIGS. 2 & 4). Actually, the temperature sensor 54 is a thermocouple and the wires leading from it are contained in a tube 56 which is located along the tubular case 44 of the nearby heater 32. Indeed, the tube 56 is offset slightly vertically and laterally with respect to the case 44 of the nearby heater 32, and at its opposite end, the wires within it pass into the small tube 48 that projects from the case of the nearby heater 32. Those wires then pass through the cross duct 50 and entry duct 52 to a location where the potential difference between them may be monitored to ascertain the temperature of the plate 30.

OPERATION

The product p, which normally is of a granular nodular character, is introduced into the vacuum chamber 4 of the vessel 2 through the airlock 10, whereupon it is deposited on the belt 14 at a generally uniform height (FIG. 1). The belt 14 transports the product p through the successive zones 16 in which it is subjected to both microwave and infrared radiation. The two types of radiation cause moisture within the product to escape and enter the chamber 4 from which it is withdrawn by the vacuum pump 8. The dried product p leaves the vacuum chamber 4 through the airlock 12.

Within any zone 16 of the chamber 4, microwave radiation from the generator 24 for that zone reflects off of the surfaces of the vessel 2 and the septums 20 and loses any uniformity in polarization that it may have had. This radiation reaches the product p on the belt 14 and excites the molecules of water within the product p, in effect heating the product p from the inside out. Even though the plate 30 of the radiator A is essentially solid metal, it still is virtually transparent to the microwave radiation. Indeed, that radiation passes through the trifoliate apertures 34, so the plate 30 does not shield the product p. In this regard, if the microwave radiation were of predictable polarization, it would be possible to use simple, straight, slots, each about one-half the wavelength long and spaced at intervals of about one-quarter to one-half the wavelength. However, since the polarization of the incident radiation is random, the apertures 34 must be configured to accommodate whatever polarization presents itself. The trifoliate configuration that has been found to best accommodate all incident polarizations.

The heaters 32, on the other hand, elevate the temperature of the plate 30 and cause it to emit infrared radiation which is directed toward the product p on the belt 14. This radiation, in contrast to the microwave radiation, heats the product p from the outside in. Indeed, by reason of the large surface area on the plate 30, substantial infrared radiation is directed toward the product p without developing excessively high temperatures within the vacuum chamber 4.

The outside-in temperature profile produced by the infrared radiation from the heaters 32 of the plates 30 counteracts the inside-out temperature profile produced by the microwave radiation. As a result, the product p experiences a rise in temperature which is generally uniform throughout that product p, both from the standpoint of the individual nodules and the product p as a whole. In other words, the product p as its temperature is elevated possesses a generally uniform temperature which is ideal for some types of products. Since, the heating takes place within the low pressure atmosphere of the vacuum chamber 32, the moisture boils at a temperature much lower than the traditional boiling point associated with water, so the product is dried without subjecting it to excessively high temperatures.

This invention is intended to cover all changes and modifications of the example of the invention herein chosen for purposes of the disclosure which do not constitute departures from the spirit and scope of the invention.

What is claimed is:

1. In combination with a vessel that encloses a chamber, a product that contains moisture and is supported in the chamber, and means for introducing microwave radiation into the chamber remote from the product to elevate the temperature of the moisture in the product so that moisture escapes from the product, the improvement residing in a thermal radiator within the chamber for directing infrared radiation toward product to also elevate the temperature of the product so as to contribute to the escape of moisture therefrom, said radiator comprising a substantially rigid metal plate positioned remote from location at which microwave energy is introduced into the chamber and having a major surface area presented toward the product, but being spaced from the product, the plate having a multitude of apertures configured to permit substantial amounts of microwave radiation of random polarization to pass through the plate and on to the product where the product is supported; and heating means attached to the plate for transferring heat into the plate, so as to elevate the temperature of the plate along the major surface area thereof that is prevented toward the product, whereby the plate directs thermal radiation to the product.

2. The combination according to claim 1 wherein the apertures are configured to pass microwave radiation in a multitude of different polarizations.

3. The combination according to claim 2 wherein the apertures are trifoliate in configuration.

4. The combination according to claim 3 wherein each aperture comprises three slots which intersect at a center.

5. The combination according to claim 4 wherein the slots are straight and project from the center at substantially 120° intervals.

6. The combination according to claim 5 wherein the trifoliate apertures are arranged in rows with the apertures of all rows possessing substantially the same orientation and the apertures of any one row being offset with respect to the apertures of the adjacent row or rows.

7. The combination according to claim 6 wherein the heaters are located between at least some of the adjacent rows.

8. The combination according to claim 5 wherein the spacing between the centers of adjacent apertures of any one row is approximately one-half the wavelength of the microwave radiation.

9. The combination according to claim 5 wherein the length of any slot of the trifoliate apertures is approximately one-fourth the wavelength of the microwave radiation.

10. The combination according to claim 1 wherein a generally horizontal supporting surface exists within the chamber and the product rests on the surface; and wherein the radiator is located above and spaced from the horizontal surface with one of its major surface areas being presented toward the supporting surface.

11. The combination according to claim 10 wherein the supporting surface is on a belt that moves within the chamber.

12. The combination according to claim 10 wherein the radiator is interposed between the supporting surface and the location at which the microwave energy is introduced into the chamber.

13. The combination according to claim 1 wherein the chamber is maintained under a vacuum.

14. The combination according to claim 1 wherein the configuration of the vessel and the substance from which it is constructed causes the microwave energy to reflect off of the surfaces thereof which line the chamber.

15. The combination according to claim 1 wherein the heating means are electrical resistance heaters which are embedded in the metal plate of the radiator.

16. A thermal radiator that is essentially transparent to radiation having a multitude of polarizations, said radiator comprising a substantially rigid metal plate having substantial major surface areas and apertures of trifoliate configuration within it, the apertures extending completely through the plate and opening out of the plate at both of its major surface areas, each trifoliate aperture having three slots which radiate from a common center in different directions and being configured to permit microwave radiation of a multitude of polarizations to pass through the plate; and heating means attached to the plate for conducting heat into the plate and elevating the temperature of the plate, so that it emits infrared radiation from at least one of its major surface areas.

17. A radiator according to claim 16 wherein the slots of each aperture are arranged at about 120° intervals around the center for that aperture.

18. A radiator according to claim 17 wherein the slots are straight.

19. A radiator according to claim 16 wherein the trifoliate apertures are arranged in rows, with the apertures within any one row possessing the same orientation.

20. A radiator according to claim 19 wherein the trifoliate apertures of all the rows possess the same orientation, but the apertures of any one row are offset with respect to the apertures in the row or rows adjacent to that one row.

21. A radiator according to claim 20 wherein each row has a longitudinal axis, and the longitudinal axes of the several rows are parallel; and wherein each trifoliate aperture has its slots arranged at substantially 120° intervals around its center and one of the slots lies along and parallel to the longitudinal axis of the row of which that aperture forms a part.

22. A radiator according to claim 21 wherein the heating means comprise resistance-type heaters which are located between adjacent rows of trifoliate apertures.

23. A radiator according to claim 22 wherein the heaters include tubular cases which are embedded in and are in intimate contact with the metal of the plate.

24. A radiator according to claim 16 wherein the trifoliate apertures are arranged in rows and the spacing between the centers of the apertures in any row is approximately 0.5 to 0.55 times the wavelength of the microwave radiation.

25. A radiator according to claim 16 wherein the length of each slot for the trifoliate apertures is approximately 0.25 to 0.27 times the wavelength of the microwave radiation.

26. In combination with a vessel that encloses a chamber containing a region in which a moisture-bearing product is supported and with means for directing microwave energy into the chamber to remove moisture from the product, the improvement comprising a thermal radiator located in the chamber for directing infrared radiation toward the product to contribute to the removal of moisture from the product, said radiator comprising: a rigid metal plate having a major surface area presented toward the region of the chamber in which the product is supported, the plate further having apertures which permit substantial amounts of microwave radiation of random polarization to pass through the plate to the region of the chamber where the product is supported, the apertures being of trifoliate configuration and further being arranged in rows; and electrical resistance-type heaters embedded in the plate between at least some of the rows of trifoliate apertures for elevating the temperature of the plate, whereby the plate emits thermal radiation.

27. The combination according to claim 26 wherein the radiator is interposed between the region where the product is supprted and the location at which the microwave energy is introduced into the chamber.

* * * * *